(12) United States Patent
Choong et al.

(10) Patent No.: US 12,285,811 B2
(45) Date of Patent: Apr. 29, 2025

(54) METHOD OF MACHINING BRITTLE MATERIALS

(71) Applicant: University of Newcastle upon Tyne, Tyne and Wear (GB)

(72) Inventors: Zi Jie Choong, Tyne and Wear (GB); Dehong Huo, Tyne and Wear (GB); Patrick Degenaar, Tyne and Wear (GB); Anthony O'Neill, Tyne and Wear (GB)

(73) Assignee: University of Newcastle upon Tyne, Tyne and Wear (GB)

( * ) Notice: Subject to any disclaimer, the term of this patent is extended or adjusted under 35 U.S.C. 154(b) by 1518 days.

(21) Appl. No.: 16/339,087

(22) PCT Filed: Oct. 6, 2017

(86) PCT No.: PCT/GB2017/053027
§ 371 (c)(1),
(2) Date: Apr. 3, 2019

(87) PCT Pub. No.: WO2018/065783
PCT Pub. Date: Apr. 12, 2018

(65) Prior Publication Data
US 2020/0039109 A1 Feb. 6, 2020

(30) Foreign Application Priority Data
Oct. 6, 2016 (GB) ...................................... 1616955

(51) Int. Cl.
*B23C 3/00* (2006.01)

(52) U.S. Cl.
CPC ............ *B23C 3/00* (2013.01); *B23C 2220/00* (2013.01); *B23C 2226/27* (2013.01)

(58) Field of Classification Search
CPC .... B23C 3/28; B23C 3/30; B23C 3/34; B23C 5/1009; B23C 2220/36; B23C 2220/363;
(Continued)

(56) References Cited

U.S. PATENT DOCUMENTS 3,027,341 A * 3/1962 Boucher ................ C08G 63/42
525/438
4,466,178 A    8/1984 Soclof
(Continued)

FOREIGN PATENT DOCUMENTS

AU    2007237152 B2    6/2009
CN        1556771        12/2004
(Continued)

OTHER PUBLICATIONS

Office Action from EP Application No. 17783978.4 dated Oct. 15, 2021.
(Continued)

*Primary Examiner* — Nicole N Ramos
(74) *Attorney, Agent, or Firm* — Troutman Pepper Locke LLP; Ryan A. Schneider; Korbin M. Blunck

(57) ABSTRACT

A method of cutting (e.g. micro-milling) brittle materials where a protective ductile layer is present on the brittle material during the cutting step. The method offers an improved edge quality of the machined profile relative to previous cutting (e.g. micro-milling) techniques. A machined product obtained by or obtainable by this method is disclosed.

15 Claims, 6 Drawing Sheets

(58) Field of Classification Search
CPC .......... B23C 2220/366; B23C 2220/48; B23C 2226/18; B23C 2226/45; B23C 2226/72; B23C 2226/73
See application file for complete search history.

(56) References Cited

U.S. PATENT DOCUMENTS

| | | | |
|---|---|---|---|
| 5,082,359 A * | 1/1992 | Kirkpatrick | C23C 16/0263 427/586 |
| 6,224,469 B1 * | 5/2001 | Ohmori | B24D 3/34 451/72 |
| 6,342,306 B1 * | 1/2002 | Ozawa | F16C 33/128 508/105 |
| 7,241,489 B2 | 7/2007 | Argoitia et al. | |
| 8,877,077 B2 | 11/2014 | Lichtensteiger | |
| 2005/0001278 A1 | 1/2005 | Chen et al. | |
| 2007/0127995 A1 * | 6/2007 | Matsumura | B23C 3/30 409/132 |
| 2010/0078811 A1 | 4/2010 | Meyer-Berg | |
| 2011/0259936 A1 | 10/2011 | Lichtensteiger | |
| 2013/0288050 A1 * | 10/2013 | Arruda | B32B 5/22 428/401 |
| 2016/0218044 A1 | 7/2016 | Meyer-Berg et al. | |

FOREIGN PATENT DOCUMENTS

| | | | | |
|---|---|---|---|---|
| CN | 104526891 | | 4/2015 | |
| DE | 102014210371 A1 * | | 12/2015 | ........... B23B 27/148 |
| EP | 0068074 A2 | | 1/1983 | |
| EP | 0704285 A2 | | 4/1996 | |
| EP | 1659093 | | 5/2006 | |
| EP | 1950256 A1 | | 7/2008 | |
| JP | 09155617 A * | | 6/1997 | |
| JP | 2000 033799 A | | 2/2000 | |
| JP | 2002254232 A * | | 9/2002 | ............... B23C 3/00 |
| JP | 2005096399 | | 4/2005 | |
| JP | 2006339373 A | | 12/2006 | |
| JP | 2011005741 | | 1/2011 | |
| JP | 2011005741 A * | | 1/2011 | |
| KR | 20080030057 A * | | 4/2008 | |
| NL | 1030004 C2 | | 3/2007 | |
| TW | I228804 B | | 3/2005 | |
| WO | 2007035097 A2 | | 3/2007 | |
| WO | 2008024432 | | 2/2008 | |
| WO | 2009/126255 A1 | | 10/2009 | |
| WO | 2015/174909 A1 | | 11/2015 | |

OTHER PUBLICATIONS

International Preliminary Report on Patentability date mailed Apr. 18, 2019 for Related International Application No. PCT/GB2017/053027, 8 pages.
International Search Report and Written Opinion mailed Dec. 14, 2017 in PCT/GB2017/053027.
Examination Report from EP Application No. 17783978.4 dated Sep. 28, 2022.
Search Report from GB Application No. 1616955.9 dated Mar. 7, 2017.
Office Action from EP Application No. 17783978.4 dated Apr. 3, 2021.
Office Action from CN Application No. 201780062090.9 dated Jul. 31, 2020.
Office Action from CN Application No. 201780062090.9 dated Mar. 31, 2021.
Office Action from EP Application No. 171783978.4 dated Jul. 13, 2023.

* cited by examiner

METHOD OF MACHINING BRITTLE MATERIALS

This invention relates to a method of cutting (e.g. micro-milling) brittle materials. The method offers an improved edge quality of the machined profile relative to previous cutting (e.g. micro-milling) techniques. The invention also relates to the products of said methods.

BACKGROUND

Silicon is a hard and brittle material that is widely used in the semiconductor and Micro-Electro-Mechanical Systems (MEMS) industrial sectors. The forming of channels in silicon, particular at micro-scale, can be challenging as good machining quality and high accuracy form factors are required.

Currently, subtractive techniques such as deep reactive ion etching (DRIE) and wet etching are typically used in the MEMS/semiconductor industries. These techniques can achieve patterned subtraction by patterning etch stops via photolithography. These techniques lend themselves well to large scale manufacture. However, these techniques are largely limited to planar structures and are unsuited to the machining of more sophisticated structures. The technique need to be tuned for specific materials and the processes become complex if the creation of microstructures is required, rather than simply etching straight lines.

Laser based techniques using pico- and femto-second lasing have been shown to achieve good finishing for silicon micro-machining. However, the processing time is very slow.

Silicon may also be manufactured mechanically by grinding, lapping and polishing. This is an abrasive method and is commonly employed for thinning of completed silicon-based device wafers and flattening of diced silicon wafers. It is not suitable when high quality machining is required.

Mechanical micro-milling is a potential maskless alternative that could achieve new types of non-planar, three-dimensional structures. Micro-milling has shown great promise in the micro-machining of ductile materials. However, the generation of excessive amounts of surface and subsurface damage, such as edge chipping, remains a challenge in micro-milling of brittle materials. This problem becomes particularly problematic when machining up to several hundreds of microns in depth.

Gallium nitride, used in LEDs, is another brittle material for which high quality methods of micro-machining are required. Surface and edge quality of the machined profile has a strong effect on the opto-electronic performance. Choong et al. (*Proc. IMechE PartB: J Engineering Manufacture*, p1-9, 2016) have shown that the selection of the crystallographic orientation of crystals and the nature of the cutting tools deployed can provide a reduction in surface edge chipping. However, the reduction is not enough to provide products of suitable quality for many applications.

There remains a need for methods of machining brittle materials

BRIEF SUMMARY OF THE DISCLOSURE

In accordance with a first aspect of the present inventions there is provided a method of cutting a channel in a brittle material; the method comprising:
providing a composite material in which a layer of ductile material is arranged on a surface of a brittle material; and
cutting a channel through the layer of ductile material, removing the portion of the ductile material that is arranged over the portion of the brittle material that is to be cut, and into the brittle material to provide a machined composite.

The inventors have found that applying a coating of a ductile material to the surface of a brittle material provides a significant reduction in the amount of surface edge chipping formed in micro-milling and other cutting techniques. Without wishing to be bound by theory, it is believed that the ductile material acts as an energy buffer and the amount of impact energy generated during contact between the cutting tool and the brittle material that is translated into the brittle material is reduced.

The method may be a method of milling, grinding, turning, drilling or fly cutting, e.g. by micro-milling, micro-grinding, micro-turning, micro-drilling or fly cutting. In this case the channel may be cut into and through the layer of ductile material by milling, grinding, turning, drilling or fly cutting, e.g. by micro-milling, micro-grinding, micro-turning, micro-drilling or fly cutting. Preferably, the method is a method of milling and case the channel is milled into and through the layer of ductile material.

Preferably, the layer of ductile material is in direct contact with the surface of the brittle material.

The reduction in edge chipping is most profound when the ductile material is in direct contact with the surface of the brittle material. In certain circumstances, where the ductile material is attached to the brittle material using an intermediate or adhesive layer, an acceptable amount of edge chipping is observed only when cutting (e.g. milling) a channel having less than a certain depth (for silicon that depth is about 100 μm). However, where the ductile material is in direct contact with the brittle material, an acceptable amount of edge chipping is observed even at greater channel depths (for silicon, greater than around 100 μm).

The step of providing the composite material may comprise applying a layer of a ductile material to the surface of the brittle material to provide the composite material. The step of providing the composite material may comprise applying a layer of a ductile material directly to a surface of the brittle material to provide the composite material.

The method may also comprise the step of removing the ductile material from the machined composite to provide a machined sample of the brittle material. Alternatively, it may be that the desired product is the cut (e.g. milled) composite. The ductile material could act for example as a protective layer for the underlying brittle material. This is particularly the case where the ductile layer is an insulating material such as a polymer.

The channel may be a straight channel in a plane parallel to the surface of the brittle material (i.e. in plan-view, when viewed along an axis perpendicular to the plane of the surface of the brittle material). It may be however, that the channel comprises at least one curve and/or angle in a plane parallel to the surface of the brittle material. It may be that the channel comprises a plurality of curves and/or angles in a plane parallel to the surface of the brittle material. This present invention finds most utility in forming complex shapes. Many existing methodologies for machining brittle materials are inadequate for forming complex shapes.

The cross-sectional profile of the channel (i.e. perpendicular to the plane of the surface of the brittle material) may be rectangular. It may be however, that the channel has any 2 or 2.5 dimensional profile (In machining, 2.5 dimensional (2.5D) refers to a surface that includes projection from a plane into the 3rd dimension, with no overhanging elements.

Accordingly, 2.5D surfaces may be represented as a contour map, with only one depth or height value perpendicular to each point of the plane.). Some portions of the cross section of the channel may be deeper than others. Thus, the channel may have a curved base, a sloped base or it may have a stepped base. The cutting of the channel may be the first step in the formation of a 3D material.

The channel may have the same depth along its length or it may have different depths along its length. Where the channel has different depths, it may be that the transition between the depths is a smooth transition, or it may be that the transition from one depth to another involves one or more steps.

The brittle material may be monocrystalline, i.e. it may be in the form of a single crystal. The brittle material may be polycrystalline.

Exemplary brittle materials include ceramics and crystalline elements (e.g. germanium and silicon). Exemplary ceramics included glasses and porous ceramics. The brittle material may be selected from: silicon, germanium, SiGe, gallium nitride, borosilicate glass, silica glass, soda-lime glass, concrete, porcelain, stone, tiles, alumina (e.g. sapphire), zirconia, lithium niobate, silicon carbide, boron carbide, aluminium nitride, silicon nitride and tungsten carbide. Particularly preferred brittle materials include: silicon, germanium, SiGe, sapphire and gallium nitride. The brittle material may be silicon. The brittle material may be gallium nitride. The brittle material may be sapphire. The brittle material may be a glass.

Exemplary ductile materials include metals and metal alloys and polymers. Exemplary metals and metal alloys include non-ferrous metals or alloys comprising non-ferrous metals. Thus, exemplary ductile materials include aluminium, chromium, copper and alloys comprising aluminium, chromium or copper. Particularly preferred ductile materials include copper and alloys thereof. The ductile material may be copper.

Exemplary polymers include both thermoplastic and thermoset polymers. Particular examples include acrylics and epoxy resins. Thus the ductile material may be an acrylic polymer. The ductile material may be selected from acrylonitrile butadiene styrene (ABS) and poly(methyl methacrylate) (PMMA). The ductile material may be polyvinylchloride (PVC). The ductile material may be an epoxy resin. Thus, the ductile material may be SU-8.

The ductile material may be selected such that the work of adhesion between the ductile material and the brittle material is greater than 50 mJ/m$^2$. It may be that the work of adhesion between the ductile material and the brittle material is greater than 70 mJ/m$^2$. It may be that the work of adhesion between the ductile material and the brittle material is greater than 80 mJ/m$^2$. The reduction in edge chipping is most profound when the ductile material is strongly bound to the surface of the brittle material. In certain circumstances, where the ductile material is reasonably well attached to the brittle material using an intermediate or adhesive layer, an acceptable amount of edge chipping is observed only when milling a channel having less than a certain depth (for silicon that depth is about 100 μm). However, where the ductile material is strongly bound with the brittle material, an acceptable amount of edge chipping is observed even at greater channel depths (for silicon, greater than around 100 μm). One method of calculating the work of adhesion between two surfaces is provided below.

It may be that brittle material is in the form of a single crystal. The channel may be milled along the <100> direction of the crystal. This is particularly preferred where the brittle material is silicon. The silicon may be a {100} surface silicon wafer. It has been observed that milling along this direction can reduce surface edge chipping.

The channel may be milled using a horizontal axis mill, in which the spindle axis is parallel to the surface of the brittle material. During the horizontal axis milling, with respect to the brittle material, the spindle axis of the milling cutter may be moved in the same direction as the cutting edges of the rotating milling cutter that bear upon the brittle material, which is known as up-milling (or conventional milling). Alternatively, during the horizontal axis milling, with respect to the brittle material, the spindle axis of the milling cutter may be moved in the opposite direction from the cutting edges of the rotating milling cutter that bear upon the brittle material, which is known as down-milling (or climb milling). Up-milling can reduce surface edge chipping relative to down-milling. Without wishing to be bound by theory, it is believed that this is because the amount of material removed by each cutting edge during a cut pass begins from a very small value at the start of a cut pass and increases towards the end of each cut pass, promoting plastic deformation during material removal rather than brittle fracture.

The milling step will typically be carried out with a milling tool (i.e. milling cutter) having cutting edges that circumscribe a cylindrical surface in use (e.g. the cutting edges may extend parallel to the spindle axis, or may extend helically about the spindle axis). The milling cutter may be an Arbor milling cutter or a horizontally mounted end-mill. It may be that the milling cutter is a diamond coated milling cutter (e.g. a diamond coated tungsten carbide milling cutter), a chemical vapour deposited (CVD) diamond milling cutter or a single crystal diamond milling cutter. It may be that the milling cutter is a diamond coated milling cutter. It has been observed that such tools, and particularly diamond coated milling cutters, reduce surface edge chipping relative to alternative tools. Alternatively, the tool may be coated with TiAlN.

It may be that the layer of ductile material has a thickness from 10 to 500 μm. It may be that the layer of ductile material has a thickness from 25 to 500 μm. It may be that the layer of ductile material has a thickness from 50 to 250 μm. It may be that the layer of ductile material has a thickness from 75 to 150 μm. It may be that the layer of ductile material has a thickness from 20 to 150 μm. The inventors have shown that thicknesses as low as 20 μm provide a protective effect.

It may be that the brittle material is from 50 μm to 100 mm thick. It may be that the brittle material is from 100 μm to 1000 μm thick. It may be that the brittle material is from 400 μm to 600 μm thick. It may be that the brittle material is 500 μm thick.

It may be that the channel that is cut (e.g. milled) into the brittle material is from 5 μm to 500 μm deep. For the absence of doubt, this is the depth of the channel in the final product after the ductile material has been removed and corresponds to the distance from the interface between the brittle material and the ductile material to the bottom of the channel in the composite. It may be that the channel that is cut (e.g. milled) into the brittle material is from 10 μm to 150 μm deep. It may be that the channel that is cut (e.g. milled) into the brittle material is from 100 μm to 200 μm deep. Depths of greater than 100 μm may require that the brittle material and the ductile material are in direct contact and/or that the work of adhesion between the ductile material and the brittle material is greater than 80 mJ/m$^2$ in order to achieve the desired machining quality for certain applications, for example, where the brittle material is silicon. Where the channel has either variable depth across its cross section or along its length, the depth referred to in this paragraph is that of the deepest portion of the channel.

A small change in the cutting force is typically observed when the cutting tool reaches the interface between the brittle material and the ductile material and this can be used to determine (within machining tolerances) the depth of the channel that is cut (e.g. milled) into the brittle material even where the depth of the layer of ductile material is not known or varies across the surface of the brittle material.

It may be that the channel that is cut into the brittle material is from 50 μm to 1000 μm wide. Machining on this scale might be described as micromachining. The machined composite may be described as a micro-machined composite in which case where the ductile material is removed, doing so provides a micro-machined sample of the brittle material.

Preferably, the method is a method of milling a brittle material. In this case, it may be that the spindle speed of the milling tool used to mill the channel is from 10,000 to 100,000 r/min. It may be that the spindle speed is from 25,000 to 75,000 r/min. These embodiments apply particularly where the brittle material is silicon.

It may be that the cutting speed ($V_c$) of the milling tool used to mill the channel is from 0.1 to 150 mm/min. It may be that the spindle speed is from 5 to 100 mm/min. These embodiments apply particularly where the brittle material is silicon.

It may be that the cutting speed of the milling tool used to mill the channel is from 0.1 to 150 mm/min. It may be that the spindle speed is from 5 to 100 mm/min. These embodiments apply particularly where the brittle material is silicon.

It may be that the feed per tooth (fz) of the milling tool is from 0.01 to 0.3 μm/tooth. It may be that the feed per tooth of the milling tool is from 0.05 to 0.1 μm/tooth, particularly where the tool (milling cutter) is a diamond coated end-mill. It may be that the feed per tooth of the milling tool is from 0.1 to 0.2 μm/tooth, particularly where the tool is a CVD diamond or single crystal diamond end-mill. These embodiments apply particularly where the brittle material is silicon.

It may be that the milling equipment comprises an air bearing spindle. It may be that the milling equipment comprises a three axis actuation stage. It may be that the milling equipment comprises a force measurement sensor.

Where the ductile material is a metal, e.g. copper, it may be that an intermediary metal layer is applied to the brittle material and that the ductile metal is subsequently applied to the intermediary metal layer by electroplating. The composite material thus comprises the intermediary metal layer sandwiched between the layer of ductile metal and the surface of the brittle material. It may be that the intermediary metal layer is from 10 to 100 nm thick. It may be that the intermediary metal layer is from 25 to 75 nm thick. It may be that the intermediary metal layer is titanium.

Alternatively, it may be that the ductile metal, e.g. copper, layer is applied directly to the surface of the brittle material. This may be achieved, for example, by sputtering. Alternatively, with certain materials, this could be achieved by direct electroplating.

Where the ductile material is a metal, e.g. copper, it may be that the copper is removed by exposing the copper layer to hydrofluoric acid, e.g. to a mixture of nitric acid and hydrofluoric acid solutions. Where an intermediate metal layer is present, these conditions will typically also dissolve the intermediate metal layer.

It may be that the ductile layer is an acrylic polymer or copolymer. If so, it may be that the acrylic is applied to the surface of the brittle material as an emulsion paint, e.g. by dipping the brittle material into the paint or by spray coating the brittle material.

It may be that the ductile layer is an epoxy resin, e.g. SU-8. If so, it may be that the epoxy resin is applied to the surface of the brittle material by sputtering or spin-coating.

Where the ductile layer is a polymer, it may be removed using an appropriate organic solvent. An exemplary organic solvent, particularly useful for acrylic polymers, is acetone.

Alternatively, plasma etching may be used to remove polymer layers (e.g. epoxy layers). Plasma etching offers a reduced thermal load, unlike pure chemical etching. In addition, there will be no organic residues on the surface of the cut brittle material.

It may be that the average length of edge chipping is less than 50 μm. It may be that the average length of edge chipping is less than 25 μm. It may be that the average length of edge chipping is less than 15 μm. Edge chipping can be quantitatively characterized by taking an average length measurement on the chipped surface across fifty equally spaced data points along the vertical image view of the machined channel.

In a second aspect of the invention there is provided a machined product obtained by or obtainable by the methods of the first aspect of the invention.

The invention may be further described in the following numbered paragraphs:

1. A method of milling a micro-scale channel in a brittle material; the method comprising:
   providing a composite material in which a layer of ductile material is arranged on a surface of a brittle material; and
   milling a channel through the layer of ductile material and into the brittle material to provide a micro-machined composite.
2. A method of paragraph 1, wherein the layer of ductile material is in direct contact with the surface of the brittle material.
3. A method of paragraph 1 or paragraph 2, wherein the method step of providing the composite comprises applying a layer of a ductile material to the surface of a brittle material to provide the composite material.
4. A method of any one of paragraphs 1 to 3, wherein the method also comprises the step of removing the ductile material from the micro-machined composite to provide a micro-machined sample of the brittle material.
5. A method of any one of paragraphs 1 to 4, wherein the channel comprises at least one curve and/or angle in a plane parallel to the surface of the brittle material.
6. A method of any one of paragraphs 1 to 5, wherein the channel comprises a plurality of curves and/or angles in a plane parallel to the surface of the brittle material.
7. A method of any one of paragraphs 1 to 6, wherein the ductile material is selected from aluminium, chromium, copper and alloys thereof.
8. A method of any one of paragraphs 1 to 6, wherein the ductile material is an acrylic polymer.
9. A method of any one of paragraphs 1 to 6, wherein the ductile material is an epoxy resin.
10. A method of any one of paragraphs 1 to 9, wherein the brittle material is from 50 μm to 100 mm thick.
11. A method of any one of paragraphs 1 to 10, wherein the channel that is milled into the brittle material is from 5 μm to 500 μm deep.

12. A method of paragraph 11 wherein the channel that is milled into the brittle material is from 100 µm to 200 µm deep.
13. A method of any one of paragraphs 1 to 12, wherein the channel that is milled into the brittle material is from 50 µm to 1000 µm wide.
14. A method of any one of paragraphs 1 to 13, wherein the layer of ductile material is from 25 to 500 µm thick.
15. A method of any one of paragraphs 1 to 14, wherein the brittle material is selected from silicon, germanium, sapphire and gallium nitride.
16. A method of paragraph 15, wherein the brittle material is monocrystalline silicon.
17. A method of paragraph 15, wherein the channel is milled along the <100> direction of the crystal.
18. A micro-machined product obtained by or obtainable by the methods of any one of paragraphs 1 to 17.

BRIEF DESCRIPTION OF THE DRAWINGS

Embodiments of the invention are further described hereinafter with reference to the accompanying drawings, in which.

DETAILED DESCRIPTION

Figure 1:
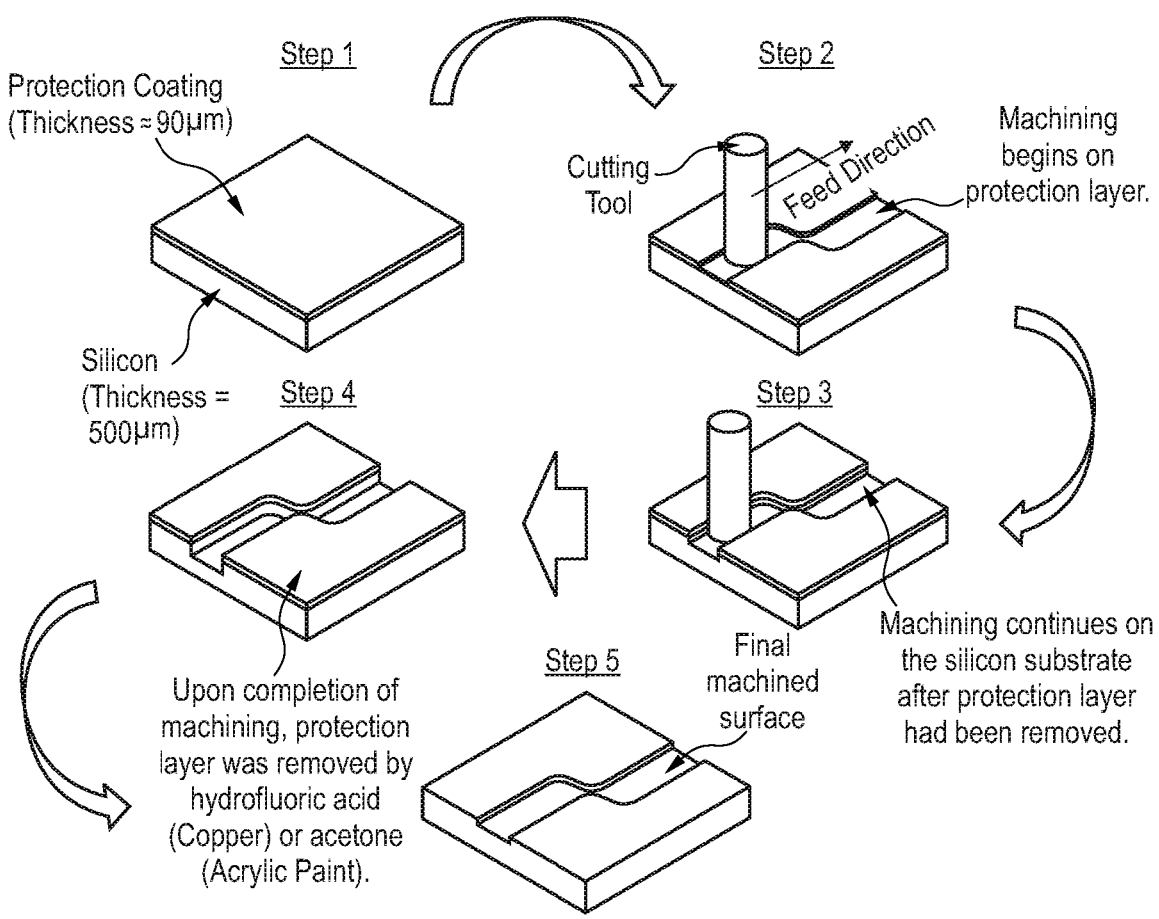
FIG. 1 shows a schematic of an exemplary method of the invention.

A brittle material as referred to in this specification is one having a fracture toughness ($K_{IC}$), the ability of a material to resist crack propagation, of up to 10 MPa√m. Certain materials of particular interest have a fracture toughness ($K_{IC}$) of up to 5 MPa√m or even up to 3 MPa√m.

A ductile material, as referred to in this specification, is one having an elongation ratio in 50 mm of 5% or greater (i.e. the % increase in length of a 50 mm sample that can be tolerated when the sample is subjected to strain). Certain materials of particular interest have an elongation in 50 mm of 10% or greater or even 25% or greater.

Where a material is described as an alloy of a metallic element, e.g. copper, it is intended to mean that the alloy comprises that metallic element. It may mean that the alloy contains greater than 50% by weight of the indicated metallic element.

Exemplary milling machines that can be used to perform the methods of the invention include: Nanoware MTS5R, Minitech Mini-Mill/GX, Kern Evo and Kugler Micromaster®3/5X.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

Example 1: Initial Study on Reduction of Edge Chipping

Experimental Method

Summary of Edge Chipping Reduction Strategy

Reducing the generation of edge chipping is important in silicon micro-milling. Chipping presence may lead to functional failure, as edge chipping is formed by a surface micro pitting and cracking. The inventors have deposited ductile materials onto the top surface of silicon to reduce edge cracking during machining. This may help to create an energy buffer that absorbs the impact energy between the cutting tool and the workpiece surface during contact. It is expected that similar results will be observed for other brittle materials.

Ductile materials, such as copper and acrylic based paint were chosen. Both materials can be easily coated onto silicon. FIG. 1 shows the schematic of an exemplary edge chipping reduction method, illustrating various processing stages in the methods of the invention.

Prior to machining, layers of copper or acrylic based paint of approximately 90 µm in thickness were respectively electroplated or manually coated as an emulsion paint onto the surface of a (001) surface silicon wafer (Step 1). For the copper on silicon workpiece, a thin sheet of titanium (not shown) at approximately 50 nm thick was used to adhere the copper onto the silicon surface to prevent any delamination.

Upon completion of the respective surface ductile layer coating processes, slot milling was conducted on the surfaces of each workpiece to create a channel (Step 2). Machining begins on the ductile layer and continues into the silicon substrate (Step 3). The cutting force was constantly monitored during the milling process. A small change in the cutting force was noticed when the depth of the cutting tool reached the interface between the ductile layer and silicon.

With the presence of this phenomenon, the location of the surface of the silicon substrate was determined and this marked the starting point for determining the depth of channel to be milled into the silicon. Finally, nitric or hydrofluoric acid solutions were used to remove the electroplated copper layer and the titanium adhesive layer, while acetone was used for the removal of acrylic based paint after machining (Steps 4 and 5).

Set-Up of Machining System

Figure 2:
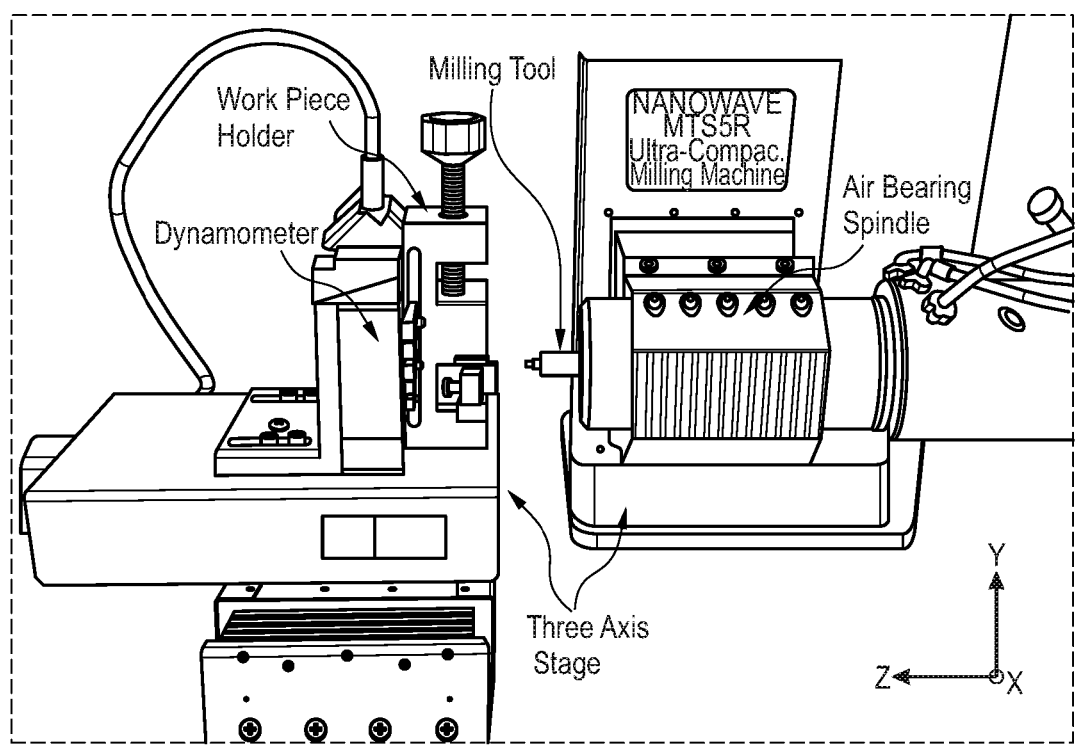
FIG. 2 shows an exemplary micro-milling system that can be used to carry out the methods of the invention.

The experiments described above were conducted on the Nanowave MTSSR micro-milling system shown in FIG. 2. It comprises of a three axes motion stage with feed precision of 0.1 μm, an air bearing spindle, a workpiece holder and Kistler dynamometer. A 0.5 mm diameter single crystal diamond end-mill with single flute was fitted onto the spindle. The spindle was mounted along the Z axis (perpendicular to the surface of the brittle material) of the motion stage. Furthermore, movement of the motion stage along the X or Y axes (parallel to the surface of the brittle material), actuates the workpiece holder and dynamometer for cutting force measurement during machining.

Experimental Procedure

Conditions to achieve good machining quality include the choice of main machining parameters namely the channel depth, feed rate and spindle speed, the tool rotation direction (i.e. up-milling or down-milling, in which the spindle axis of the milling cutter is moved respectively in the same or the opposite direction from the cutting edges that contact the brittle material). Machining along <100> directions on a {100} surface silicon wafer was preferred. This was due to the <100> directions having higher fracture toughness as compared to other orientations. Table 1 shows the optimal range and also the employed machining parameters for the comparative examples described below. The optimal ranges were not used for the comparative examples described below in order to demonstrate the efficacy of the methods of the invention at reducing edge chipping even in sub-optimal conditions.

TABLE 1

Machining conditions for silicon micro-milling, investigations

| Feed per Tooth fz, (μm/tooth) | Cutting Speed $V_c$, (m/min) | Orientation |
|---|---|---|
| Ideal Machining Parameters | | |
| <0.2 | 31.42 78.54 | <100> |
| Optimal Machining Parameters | | |
| 0.075 | 31.42 78.54 | <100> |
| Machining Parameters Employed in Comparative Examples | | |
| 0.15 | 78.54 | <100> |

Machining was carried out on the two workpieces with ductile layers to achieve several different depths of channel, ranging between 30 and 150 μm. Similar machining was also conducted on an uncoated silicon workpiece for comparison purposes. The depth of channel mentioned above refers to the distance from the base of the machined channel to the silicon surface. For the coated workpieces, machining began on the copper or polymer surface and continued into the silicon substrate. The cutting force was constantly monitored during the milling process. A small change in the cutting force was noticed when the depth of the cutting tool reaches the interfacing layer between the ductile material and silicon. Thus, the location of the surface of the silicon substrate was determined and this marked the starting point for determining the depth of channel to be milled into the silicon.

After machining, the respective workpieces were detached from the grounded metal backing and cleaned with acetone and by exposing to ultrasonic water bath. For example, Nitric and hydrofluoric acid solutions were used to remove the deposited copper and the titanium adhesive sheet from the copper coated workpiece. The acetone wash removed the acrylic paint from the paint coated workpiece. Finally, the scale of edge chipping generated on the final machined surfaces were quantitatively and qualitatively characterized using a table top Hitachi TM3030 SEM system.

Results and Discussion

Figure 3:
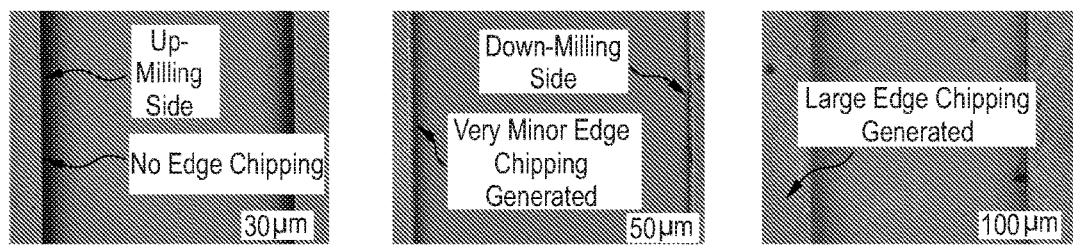
FIG. 3 shows annotated scanning electron microscopy (SEM) images of machined profiles for the micro-milling of silicon using i) a copper ductile material on a titanium adhesive layer; ii) no ductile material; and iii) an acrylic paint ductile layer.
Figure 3:
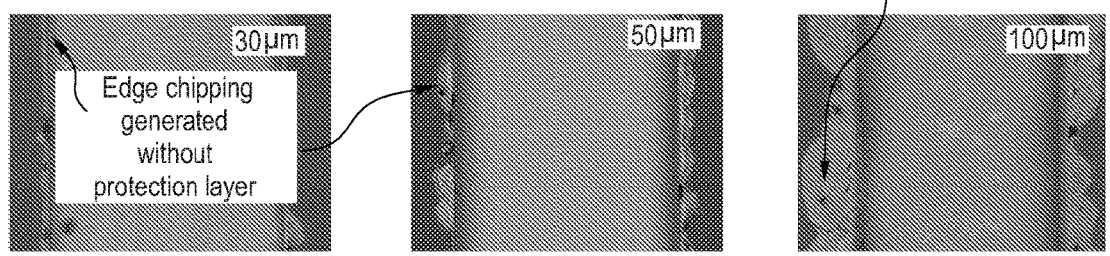
Figure 3:
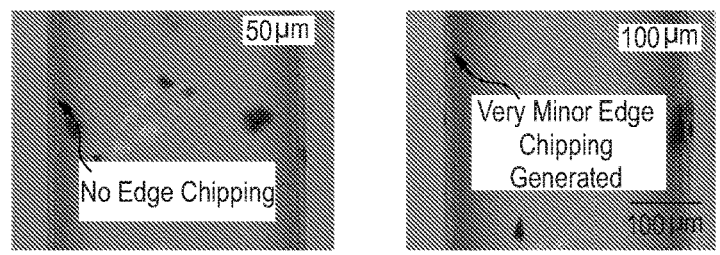

FIG. 3 shows the SEM images of the final machined surfaces on three silicon workpieces: i) one which had been coated with a copper ductile material on a titanium adhesive layer during the machining; ii) one coated with no ductile material during the machining; and iii) one which had been coated with an acrylic paint (PMMA) ductile layer during the machining.

The amount of edge chipping that can be measured is an average length. The measurement is performed on the scanning electron microscopy (SEM) images of each machined profile. Measurement was taken on the up-milling side of each machined profile.

Edge chipping was quantitatively characterized by taking an average length measurement on the chipped surface across fifty equally spaced data points along the vertical image view of the machined channel. The results are provided in Table 2.

TABLE 2

Average length of edge chipping for milling of copper/adhesive coated and acrylic coated silicon

| Channel Depth (μm) | Average Length of Edge Chipping for Copper Coated Workpiece (μm) | Average Length of Edge Chipping for Acrylic Coated Workpiece (μm) |
|---|---|---|
| 30 | ≈0 | ≈0 |
| 50 | ≈0 | ≈0 |
| 100 | ≈80 | ≈10 |

Thus, with both acrylic paint and the copper/titanium adhesive system an absence of edge chipping was observed at a channel depth of 50 μm. In contrast, the silicon that had not had a ductile layer present during machining showed significant amounts of edge chipping for 30 μm and 50 μm deep channels. Additionally, the edge chipping generated for a 100 μm deep channel for the silicon workpiece machined with an acrylic based paint layer was significantly smaller than the workpiece machined with a copper coating and a titanium adhesive layer.

Example 2 Further Study on the Reduction of Edge Chipping

In a further machinability study, a copper coated silicon sample (copper was electroplated onto silicon as in Example 1), alongside PMMA and SU-8 coated silicon samples were machined and compared with uncoated silicon sample. In this study both PMMA and SU-8 were spin coated onto silicon.

Figure 4:
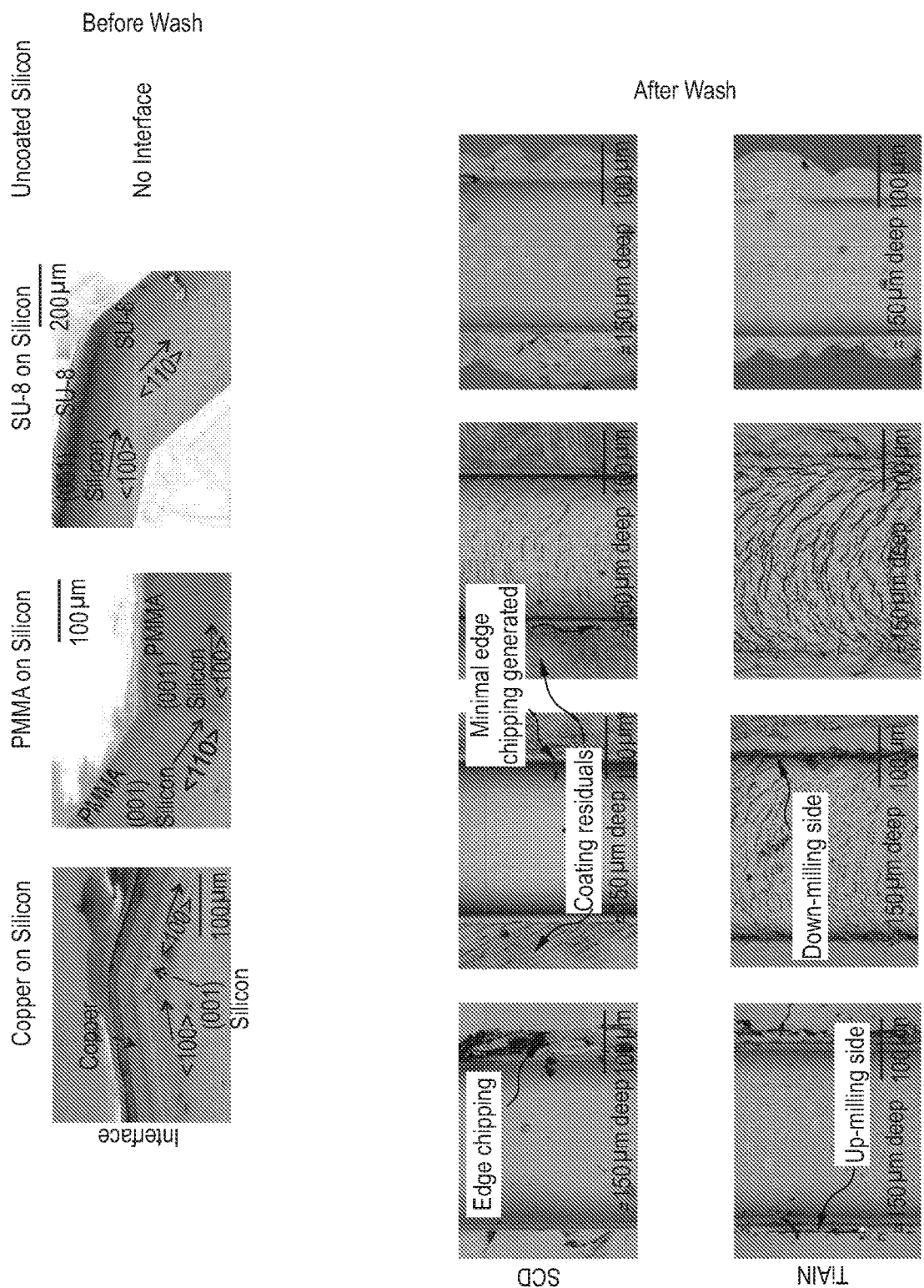
FIG. 4 shows the surface morphologies of machined samples obtained using various ductile materials and cutting tools.

Machining was conducted with both single crystal diamond (SCD) and TiAlN coated tools respectively. FIG. 4 depicts the comparison on the capability of different sacrificial materials and the cutting tool. At such a deep machining depth of 150 µm, it was evident from FIG. 4 that minimal edge chipping and surface defects can be achieved when machined with SCD alongside with either PMMA or SU-8 as the sacrificial layer.

Figure 5:
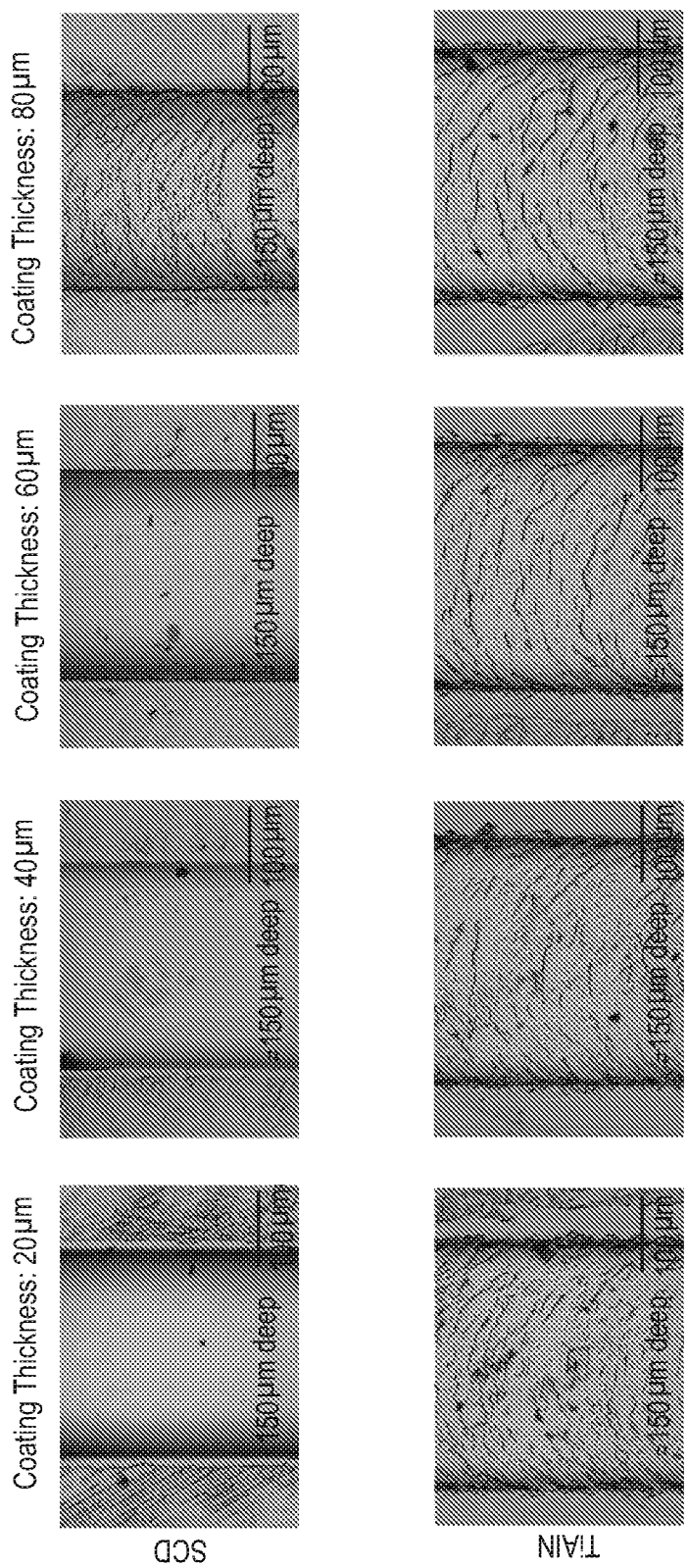
FIG. 5 shows the surface morphologies of machined silicon samples obtained using a PMMA ductile layer with various coating thicknesses.

The coating thickness was varied between 20 µm to 80 µm. FIG. 5 shows the surface morphologies of post-machined micro-grooves of PMMA coated silicon previously deposited with different coating thickness. It was also evident that with the surface edges protected by the sacrificial layer material, variation on the size of generated edge chipping was minimal with the increment of coating thickness.

Figure 6:
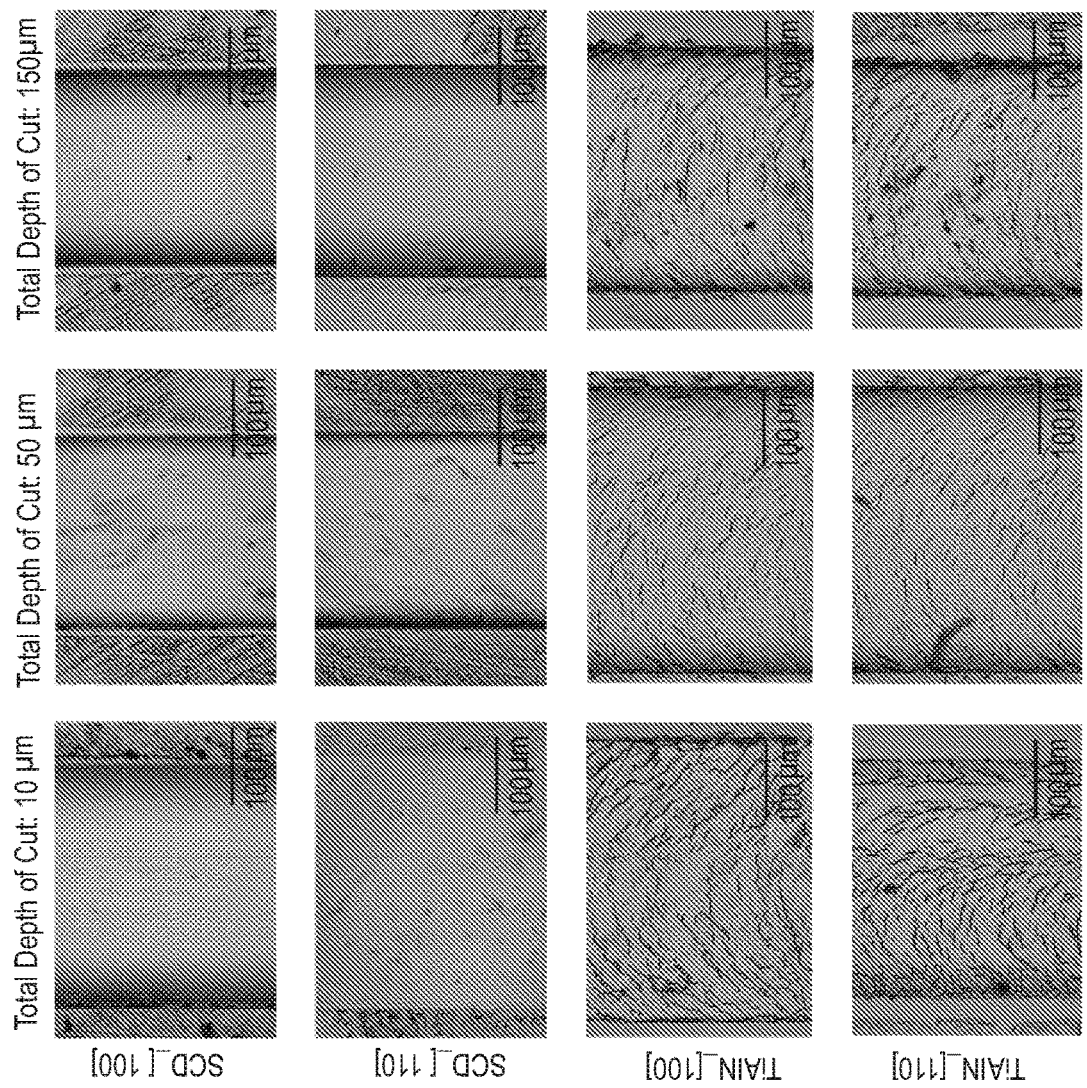
FIG. 6 shows the surface morphologies of machined silicon samples obtained using PMMA ductile layer under various machining orientations and total machined depths.

Previous work has shown that the orientation of the silicon when being machined can affect the amount of edge chipping. FIG. 6 shows the surface morphologies of post-machined silicon micro-grooves under different machining orientation at various total machining depths. In fact, minimal variation and generation of edge chipping was observed at different machining orientation and total machining depths. Furthermore, similar behaviour was also observed under the grooves machined by both single crystal diamond (SCD) and TiAlN coated tools, although the SCD tool was shown to be considerably better than the TiAlN tool.

The results of the study are summarised quantitatively in Table 3.

respectively conducted on the surfaces of copper with titanium seed layer (Cu/Ti), PMMA, SU-8 and monocrystalline silicon substrate.

Upon obtaining the relevant contact angles with respect to each tested surfaces, both the work of adhesion and interfacial tension indicating the work required to separate two surfaces and the adhesion strength respectively can be calculated by a harmonic mean model as follows:

The harmonic mean model used to approximate the interaction of low energetic phases with the polar and non-polar parts of the interfacial energy and therefore evaluate the work of adhesion $W_{ls}$:

$$W_{ls} = 4 \times \left( \frac{\gamma_l^d \times \gamma_s^d}{\gamma_l^d + \gamma_s^d} + \frac{\gamma_l^p \times \gamma_s^p}{\gamma_l^p + \gamma_s^p} \right) \quad (1)$$

where:
$\gamma_l^d \rightarrow$ non-polar part of the layer surface tension
$\gamma_l^d \rightarrow$ polar part of the layer surface tension
$\gamma_s^d \rightarrow$ non-polar part of the substrate surface tension
$\gamma_s^p \rightarrow$ polar part of the substrate surface tension Furthermore, the work of adhesion necessary to separate a liquid layer from a solid substrate in an air environment can also be deduced by the Dupre equation:

$$W_{ls} = (1 + \cos \theta) \gamma_l \quad (2)$$

where:
$\theta \rightarrow$ measured contact angle between the liquid layer and solid substrate

TABLE 3

Measured edge chipping length of various workpiece machined by SCD and TiAlN coated tools

| Channel Depth (µm) | Single Crystal Diamond Tool | | | | TiAlN Coated Tool | | | |
|---|---|---|---|---|---|---|---|---|
| | Copper (µm) | PMMA (µm) | SU-8 (µm) | Uncoated (µm) | Copper (µm) | PMMA (µm) | SU-8 (µm) | Uncoated (µm) |
| 10 | ≈0 | ≈0 | ≈0 | ≈10 | ≈0 | ≈0 | ≈0 | ≈5 |
| 50 | ≈0 | ≈0 | ≈0 | ≈55 | ≈35 | ≈5 | ≈20 | ≈30 |
| 150 | ≈30 | ≈0 | ≈0 | ≈120 | ≈20 | ≈10 | ≈55 | ≈90 |

Example 3—Work of Adhesion

There are countless methods to measure the adhesion strength of a coating, or to be specific in this context, the adhesion strength between the ductile sacrificial material and the brittle substrate material. In one method, adhesion strength was quantatively characterized through the measurement of surface wettability. Wettability, oftenly defined as the tendency on the spreading or adhesion of one fluid to a solid surface in the presence of other immiscible fluids. Such measurement can be conducted through a process known as contact angle measurement. The process involves depositing a droplet of liquid onto the surface of interest, while using a goniometer to measure the contact angle of the liquid droplet as it spreads along the surface. At least two liquid with known surface tension are commonly used in such studies. In the current study, de-ionized water (DI-$H_2O$) and 100% glycerine were chosen. Measurements were $\gamma_l$ total surface tension of layer comprising the non-polar ($\gamma_l^d$) and polar part ($\gamma_l^p$)

The contact angle of the two materials can be measured using deionized water (DI-H2O) and glycerine respectively. A number of data points are taken and the mean contact angle across those data points was determined.

Thus, the mean contact angle for copper-titanium seed layer, PMMA, SU-8 and silicon surface respectively were determined under both deionized-water and glycerine conditions. After which, the work of adhesion and interfacial tension in air environment were computed using the combination of Equation 1 and 2. Tables 3, 4 and 5 shows the mean contact angle, computed superficial surface tension of each material and the computed work of adhesion alongside with the interfacial tension respectively. Table 5 provides the calculated work of adhesion for SU-8, PMMA and copper.

Such phenomenon corroborates with the superior mechanical properties of SU-8 over both PMMA and copper used in the study.

TABLE 4

Mean of measured contact angle

| Materials | Mean Contact Angle (°) (DI-H2O) | Mean Contact Angle (°) (Glycerine) |
|---|---|---|
| Cu/Ti | 80.2 | 70.8 |
| PMMA | 75.4 | 65.4 |
| SU-8 | 64.6 | 54.4 |
| Silicon | 70.6 | 45.4 |

TABLE 5

Calculated superficial surface tension of each materials

| Materials | Superficial Tension, $\gamma$ (mJ/m$^2$) | Non-Polar, $\gamma^d$ Component (mJ/m$^2$) | Polar, $\gamma^p$ Component (mJ/m$^2$) |
|---|---|---|---|
| Cu/Ti | 31.8 | 16.0 | 15.8 |
| PMMA | 35.1 | 17.5 | 17.6 |
| SU-8 | 42.4 | 19.9 | 22.5 |
| Silicon | 48.6 | 34.8 | 13.8 |
| DI-H$_2$O | 72.8 | 21.8 | 51 |
| Glycerine | 63.4 | 37 | 26.4 |

TABLE 6

Calculated work of adhesion and interfacial tension in air environment

| Materials in Contact | Work of Adhesion (mJ/m$^2$) | Interfacial Tension (mJ/m$^2$) |
|---|---|---|
| Cu/Ti on Silicon | 73.3 | 7.1 |
| PMMA on Silicon | 77.5 | 6.2 |
| SU-8 on Silicon | 84.9 | 6.1 |

The invention claimed is:

1. A method of cutting a channel in a brittle material comprising:
   providing a composite material in which a layer of ductile material is arranged on a surface of a brittle material; and
   cutting a channel having a length through the layer of ductile material, removing a portion of the ductile material that is arranged over a portion of the brittle material that is to be cut, and into the brittle material to provide a machined composite;

wherein:
   the channel is cut by milling, grinding, turning, drilling, or fly cutting;
   the ductile material is an acrylic polymer or an epoxy resin;
   the brittle material is monocrystalline silicon;
   at least a portion of the length of the channel is cut along the <100> direction of the monocrystalline silicon; and
   the layer of ductile material is from 25 to 500 μm thick.

2. The method of claim 1, wherein the layer of ductile material is in direct contact with the surface of the brittle material.

3. The method of claim 1, wherein providing the composite material comprises applying a layer of a ductile material to the surface of a brittle material to provide the composite material.

4. The method of claim 1 further comprising removing the ductile material from the machined composite to provide a machined sample of the brittle material.

5. The method of claim 1, wherein at least a portion of the channel is arcuate in a plane parallel to the surface of the brittle material.

6. The method of claim 1, wherein the channel comprises a plurality of curves and/or angles in a plane parallel to the surface of the brittle material.

7. The method of claim 1, wherein the ductile material is an acrylic polymer.

8. The method of claim 1, wherein the ductile material is an epoxy resin.

9. The method of claim 1, wherein the brittle material is from 50 μm to 100 mm thick.

10. The method of claim 1, wherein the channel that is cut into the brittle material is from 5 μm to 500 μm deep.

11. The method of claim 10, wherein the channel that is cut into the brittle material is from 100 μm to 200 μm deep.

12. The method of claim 1, wherein the channel that is cut into the brittle material is from 50 μm to 1000 μm wide.

13. The method of claim 1, wherein the layer of ductile material is from 75 to 150 μm thick.

14. The method of claim 1, wherein the length of the channel is cut along the <100> direction of the monocrystalline silicon.

15. A machined product obtained by the method of claim 1.

* * * * *